US005749137A

United States Patent [19]

Martin

[11] Patent Number: 5,749,137

[45] Date of Patent: May 12, 1998

[54] MODULAR LOUDSPEAKER ENCLOSURE SUSPENSION RIGGING METHOD

[76] Inventor: Andrew Terry Martin, ATM Group Attn: Andrew Martin 20960 Brant Ave., Carson, Calif. 90810-1040

[21] Appl. No.: 613,029

[22] Filed: Mar. 18, 1996

Related U.S. Application Data

[62] Division of Ser. No. 243,718, May 17, 1994.

[51] Int. Cl.$^6$ .......... B23P 11/00

[52] U.S. Cl. .......... 29/434; 29/469; 29/525.01

[58] Field of Search .......... 29/434, 469, 525.01, 29/525.02, 525.03

[56] References Cited

U.S. PATENT DOCUMENTS

| | | |
|---|---|---|
| 943,174 | 12/1909 | Beard . |
| 3,782,065 | 1/1974 | Griffing . |
| 3,911,221 | 10/1975 | Wong . |
| 3,964,612 | 6/1976 | Skilliter, Jr. et al. . |
| 4,014,597 | 3/1977 | Griffin . |
| 4,190,738 | 2/1980 | Samuels . |
| 4,272,972 | 6/1981 | James . |
| 4,651,963 | 3/1987 | Busse et al. . |
| 4,660,728 | 4/1987 | Martin . |
| 4,673,057 | 6/1987 | Glassco . |
| 4,805,730 | 2/1989 | O'Neill et al. . |
| 4,979,785 | 12/1990 | Richards . |
| 5,139,223 | 8/1992 | Sedighzadehn . |
| 5,258,584 | 11/1993 | Hubbard . |
| 5,266,751 | 11/1993 | Taguchi . |
| 5,360,192 | 11/1994 | Pittella . |
| 5,368,270 | 11/1994 | Wiwczar . |

FOREIGN PATENT DOCUMENTS

| | | |
|---|---|---|
| 567115 | 5/1958 | Belgium . |
| 0 195 446 | 9/1986 | European Pat. Off. . |
| 41 15 659 | 11/1992 | Germany . |

*Primary Examiner*—David P. Bryant

*Attorney, Agent, or Firm*—Fulwider Patton Lee & Utecht, LLP

[57] ABSTRACT

A method for suspending a plurality of individual loudspeakers from an overhead support in spaced apart relationship for adjustment to different related positions and orientations relative to one another to selectively focus the acoustic throw of the loudspeakers. The method includes selecting frame members having respective first coupling elements and connectors including respective second coupling elements and respective pivot joints. The frame members are mounted to the loudspeakers and the respective second coupling elements are coupled to the respective first coupling elements between adjacent pairs of frame members to position the loudspeakers adjacent one another. The pivot joints are then adjusted to pivot the loudspeakers to selected orientations and the resulting apparatus is then suspended from an overhead support.

12 Claims, 9 Drawing Sheets

FIG. 1
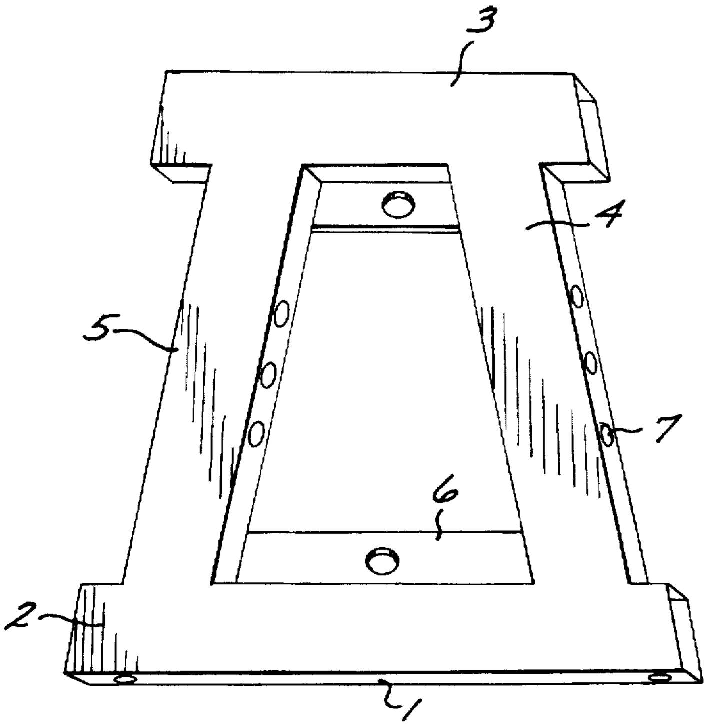
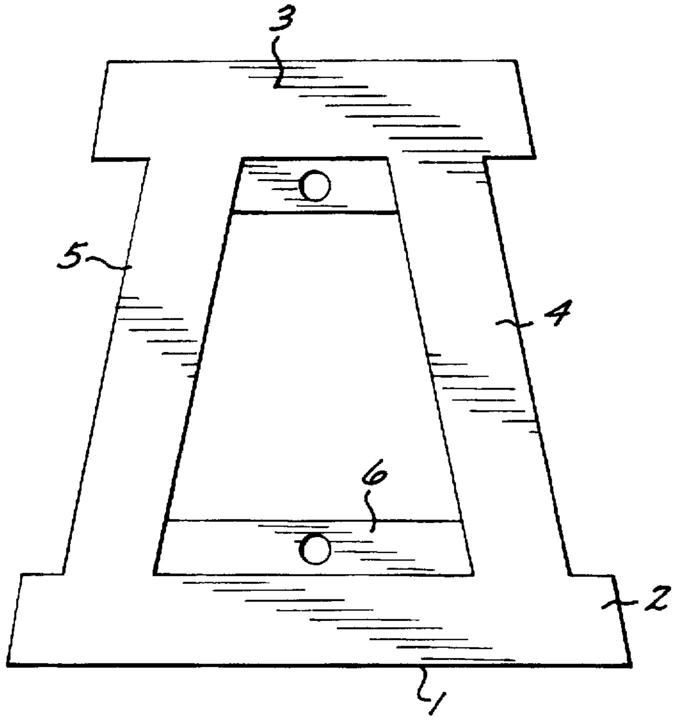
FIG. 2
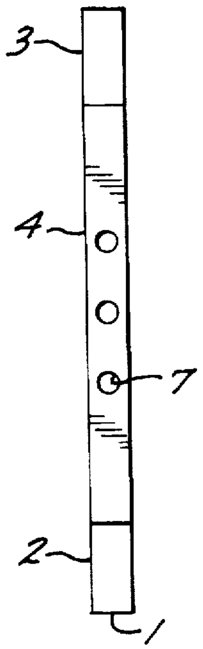
FIG. 3

FIG. 25
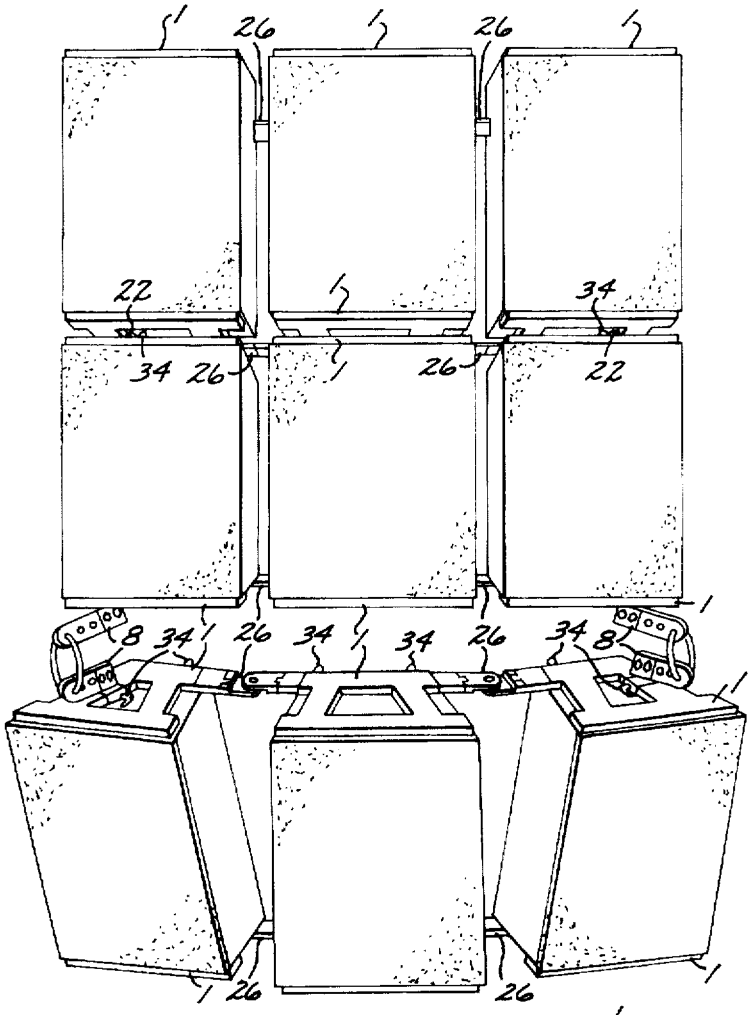
FIG. 27
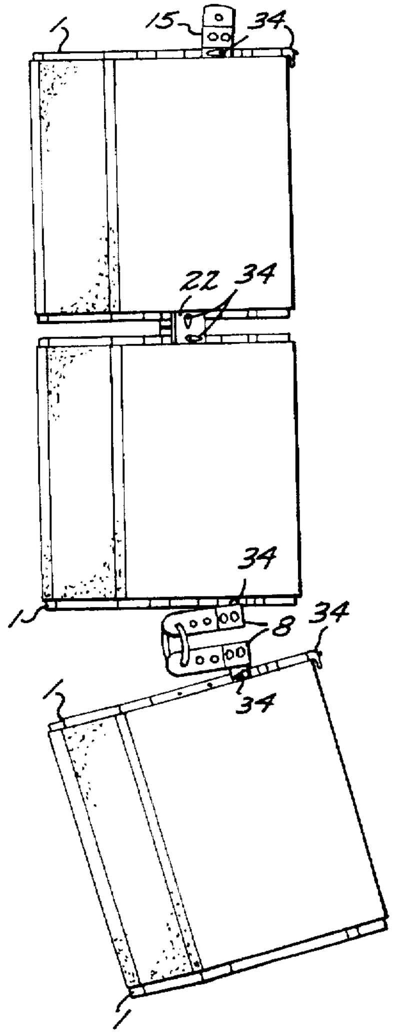
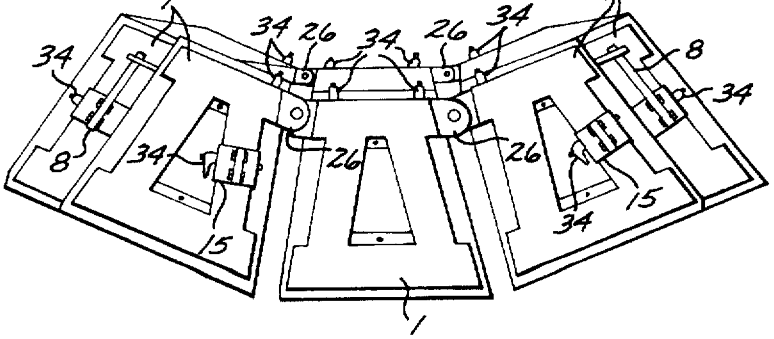
FIG. 26

MODULAR LOUDSPEAKER ENCLOSURE SUSPENSION RIGGING METHOD

This is a divisional of application Ser. No. 08/243,718 filed on May 17, 1994.

BACKGROUND OF THE INVENTION

1. Field of the Invention

The present invention is related to loudspeaker suspension systems, and more particularly to a method for suspending multiple loudspeakers from overhead supports.

2. Description of the Prior Art

Entertaining or communicating to large audiences often requires the capability of projecting highly amplified audio signals through arrays of loudspeakers in order for the audience to intelligibly hear the intended sounds. The speakers are often arranged in spatially precise orientations such that the sound produced is distributed throughout the forum occupied by the audience. In this manner, a person standing at one end of the forum experiences sounds of equivalent magnitudes and frequencies that a person standing at another end of the forum experiences. It has been found that the quality of the sound reproduced is highly dependent upon the placement and orientation of the loudspeakers in relation to one another.

Loudspeaker array design theory teaches that a loudspeaker enclosure suspension rigging system should not displace the acoustic wavefront alignment of the loudspeakers in relation to one another. If this alignment is not maintained, comb filtering will increase dramatically and the output of the loudspeaker array will cancel at certain frequencies and add at others. This comb filtering causes lobing and reduces intelligibility of the loudspeaker system as a whole.

It has also been found by those skilled in the art that the acoustic centers of the loudspeakers in the array should not be displaced from a designated point-source in space. As with the acoustic wavefront, the misalignment of acoustic centers will cause dramatically increased comb filtering. It can be difficult to align acoustic centers since they are usually located within the loudspeaker itself. This unavoidable characteristic of loudspeakers makes it very difficult to align the acoustic centers of multiple loudspeakers to a point source in space.

One solution to the problems above was proposed by U.S. Pat. No. 5,266,751 to Taguchi. This patent discloses a method of suspending a loudspeaker cabinet cluster which comprises a pair of generally triangular pyramidal loudspeaker cabinets. The loudspeaker cabinets are mounted in close spaced adjacent relationship and pivotally coupled at adjacent front edge portions to define hinges aligned along a common hinge axis. The rear ends of the respective loudspeaker cabinets are connected together and spaced with respect to one another for angling the respective cabinets relative to one another about the common hinge axis. The apparatus is then suspended. While this method is satisfactory for its intended purpose, the spaced relationship between the respective front edges of the loudspeakers are fixed relative to one another, thereby limiting overall adjustment of the loudspeakers.

Aside from sound quality, modularity and portability are important considerations in loudspeaker array design. Stage venues for audiences upwards of thousands of people may require the use of loudspeakers numbering in the hundreds. Furthermore, in the case of touring organizations, each venue is often quite different acoustically from the next. Conventional loudspeaker systems are often bulky and may require the use of an overall top hanging truss. This proved to be quite cumbersome and costly due to the labor required to repeatedly set up such an apparatus. Therefore, to effect an efficient and cost effective method of suspending arrays of loudspeakers, such arrays should be modular in nature and portable.

Thus, the need exists for a method for suspending a loudspeaker enclosure suspension rigging system that will maintain the acoustic wavefront alignment, and at the same time array the loudspeakers so that they perform optimally in relation to each other in both the vertical and horizontal planes. Additionally, those skilled in the art have recognized the need for such a system to be modular, and enable the user to attach as many loudspeakers as are necessary without an assortment of cumbersome top suspension truss variations.

SUMMARY OF THE INVENTION

Arrayed loudspeaker systems are important for successfully communicating or entertaining large audiences in relatively large venues or stages. Such systems are often suspended from overhanging supports and repeatedly set up and taken down depending on the mobility of the user. Problems often associated with conventional loudspeaker systems include poor sound quality resulting from misaligned speakers and costly transport, erection and dismantling of such systems due to a lack of modularity and portability.

The present invention solves the aforementioned problems by providing a method for suspending a plurality of individual loudspeakers. Such speakers project respective acoustic wavefronts and include respective acoustic centers that affect sound quality depending on the relative orientations of the respective loudspeakers. The method includes selecting a plurality of frame members including respective first coupling elements, and mounting the frame members to the respective loudspeakers. The steps continue with selecting a plurality of connectors including respective oppositely disposed second coupling elements and respective pivot joints. Then, the respective second coupling elements are coupled to the respective first coupling elements between respective adjacent pairs of frame members to position the loudspeakers adjacent to one another. The method continues by adjusting the respective pivot joints of the connectors to pivot the adjacent pair of loudspeakers to selected positions and orientations relative to one another such that the respective acoustic wavefronts and acoustic centers are aligned. At least one of the frame members is then suspended from an overhead support to carry the plurality of loudspeakers therewith.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 1 is a top plan perspective view of a truss module component of the present invention;

FIG. 2 is a top plan view of the truss module shown in FIG. 1;

FIG. 3 is a side elevational view of the truss module shown in FIG. 1;

FIG. 25 is a front elevational view of a multi-tiered loudspeaker grouping suspended by the method of the present invention;

FIG. 26 is a top plan view of the loudspeaker grouping shown in FIG. 25;

FIG. 27 is a side elevational view of the loudspeaker grouping shown in FIG. 25.

DETAILED DESCRIPTION OF THE PREFERRED EMBODIMENT

Figure 4:
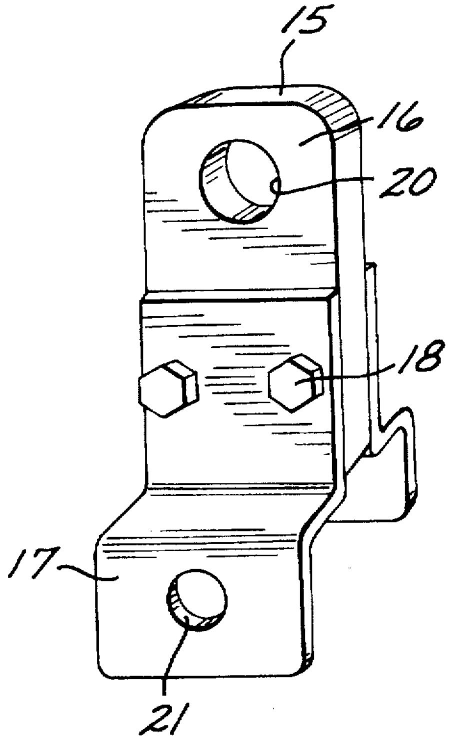
FIG. 4 is a perspective view of a shackle mount of the present invention.

Loudspeaker suspension systems play an important role in the sound quality provided by loudspeaker arrays. Such arrays comprise a plurality of individual loudspeakers positioned adjacent to one another in selected configurations to maximize the quality of sound emanating therefrom. Proper alignment of the acoustic wavefronts of the individual speakers and proper positioning of the acoustic centers comprise key design considerations for such systems. Additionally, depending upon the size of the venue, such systems may comprise hundreds of arrayed speakers, requiring an enormous expenditure of time and effort to effect proper placement for the audience. While conventional methods for suspending loudspeakers work well to provide a satisfactory level of sound quality for permanent and semi-permanent installations, such systems fail to provide the modularity and portability required to efficiently transport, erect and dismantle temporary configurations commonly undertaken by traveling stage organizations. The method of the present invention provides steps for suspending a plurality of individual loudspeakers such that the respective acoustic wavefronts and centers are aligned to provide maximum sound quality. Furthermore, the method combines such alignment capability with steps for maximizing the modularity and portability of such a loudspeaker rigging system.

Referring now to FIGS. 1–3, a frame or truss module device 1 comprises two tubular assemblies, one positioned in the front of the device 2 and one positioned in the back of the device 3. Two additional tubular assemblies or suspension supports 4 and 5 are positioned lengthwise between the tubular assemblies 2 and 3 thereby completing a framework for the truss module device. Plates 6 are added to the device for stiffening and mounting. The tubular assemblies 2, 3, 4 and 5, and the plates 6 are connected together by structural weldment. Various holes 7 are positioned throughout the tubular assemblies 2, 3, 4, and 5 to accommodate attachment of various mounts described in the present invention at several locations. FIG. 3 shows the open end of tubular assembles 2 and 3 where a connector or connecting bar device may be inserted into the truss module device.

Figure 6:
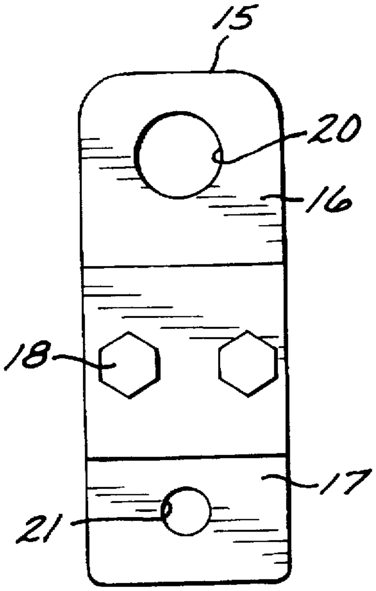
FIG. 6 is a side elevational view of the shackle mount shown in FIG. 4.
Figure 5:
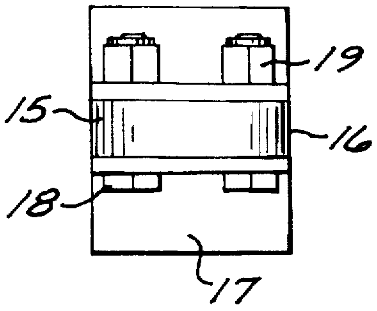
FIG. 5 is a top plan view of the shackle mount shown in FIG. 4.

With reference to FIGS. 4–6, a shackle mount device 15 comprises two identically formed assemblies 17, one positioned front and one positioned back, the back part positioned 180 degrees from the front part. An extension 16 is fastened between the two formed parts 17 with SAE grade 8 bolt type fasteners 18 and SAE grade 8 nylon insert locking nuts 19. The formed parts 17 contain high tolerance holes 21 which serve as attachment points to the truss module devices described in the present invention. The extension part 16 includes one large diameter hole 20 which serves as the suspension attachment point for the present invention.

Figure 7:
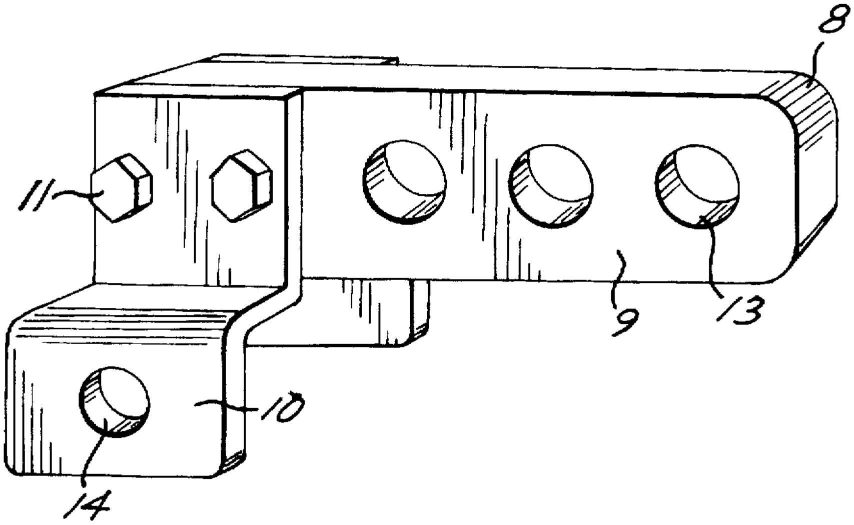
FIG. 7 is a perspective view of an extended shackle mount component of the present invention.
Figure 8:
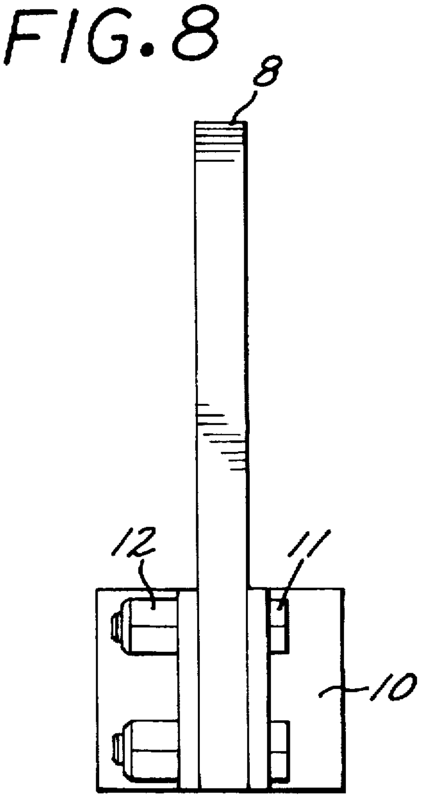
FIG. 8 is a rotated top plan view of the extended shackle mount shown in FIG. 7.
Figure 9:
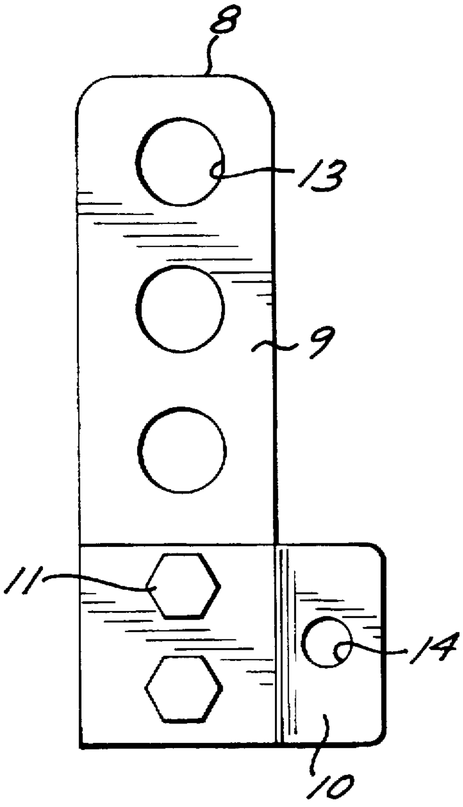
FIG. 9 is a side elevational view of the extended shackle mount shown in FIG. 8.

Referring now to FIGS. 7–9, an extended shackle mount device 8 comprises two identically formed assemblies 10, one positioned front and one positioned back, the back part positioned 180 degrees from the front part. An extension 9 is fastened between the two formed parts 10 with SAE grade 8 bolt type fasteners 11 and SAE grade 8 nylon insert locking nuts 12. The formed parts 10 contain high tolerance holes 14 which serve as the attachment point to the truss module devices described in the present invention. The extension part 9 includes several large diameter holes 13 which serve as the suspension attachment point for the present invention.

Figure 10:
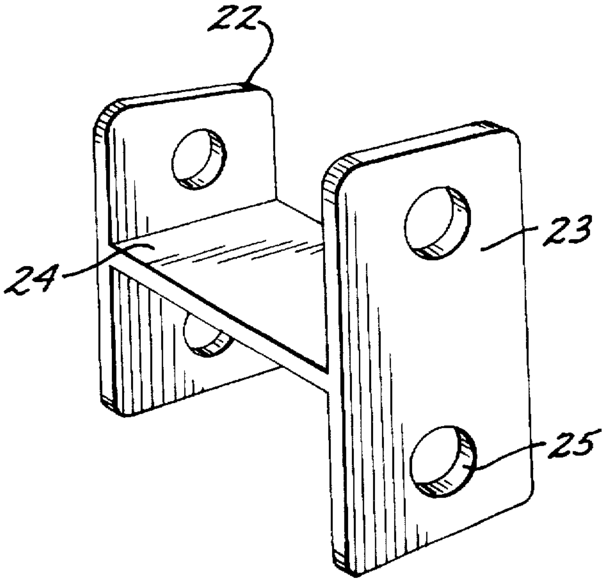
FIG. 10 is a perspective view of a stacking bracket mount of the present invention.
Figure 11:
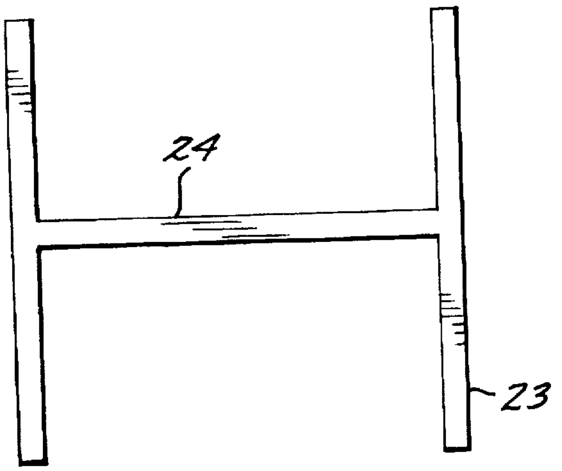
FIG. 11 is a side view of the stacking bracket mount shown in FIG. 10.
Figure 12:
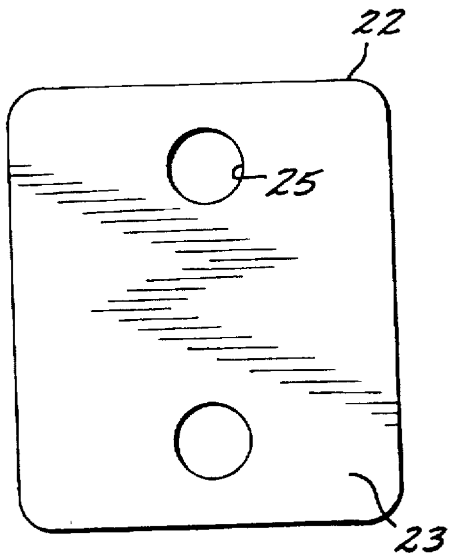
FIG. 12 is a side elevational view of the stacking bracket mount shown in FIG. 11.

Referring now to FIGS. 10–12, a stacking bracket device 22 comprises two identically shaped assemblies 23, one positioned on either side of a perpendicularly positioned plate 24 and connected together by structural weldment. Assemblies 23 contain high tolerance holes 25 which serve as attachment points to the truss module devices described in the present invention.

Figure 13:
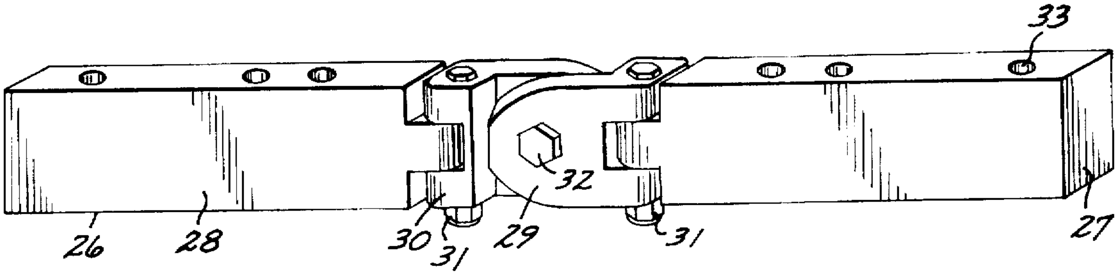
FIG. 13 is a perspective view of the connecting bar component of the present invention.
Figure 14:
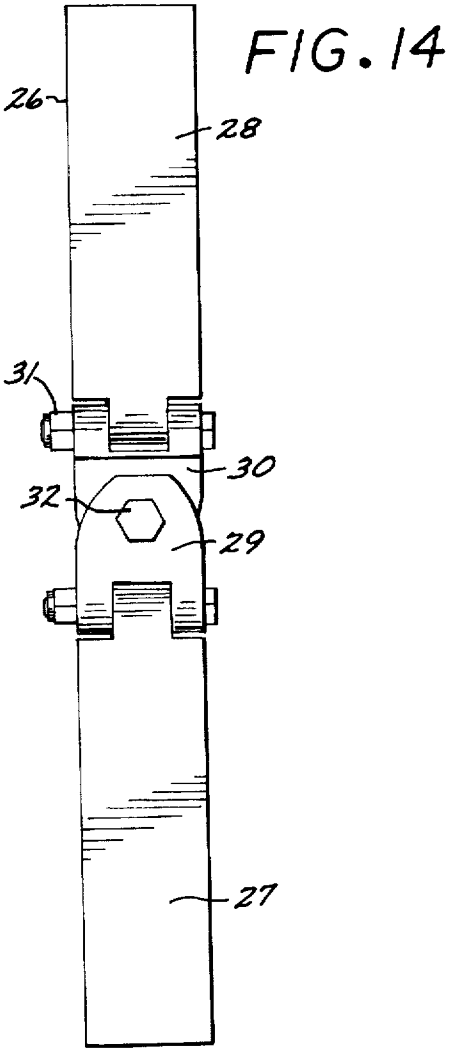
FIG. 14 is a rotated side elevational view of the connecting bar shown in FIG. 13.
Figure 15:
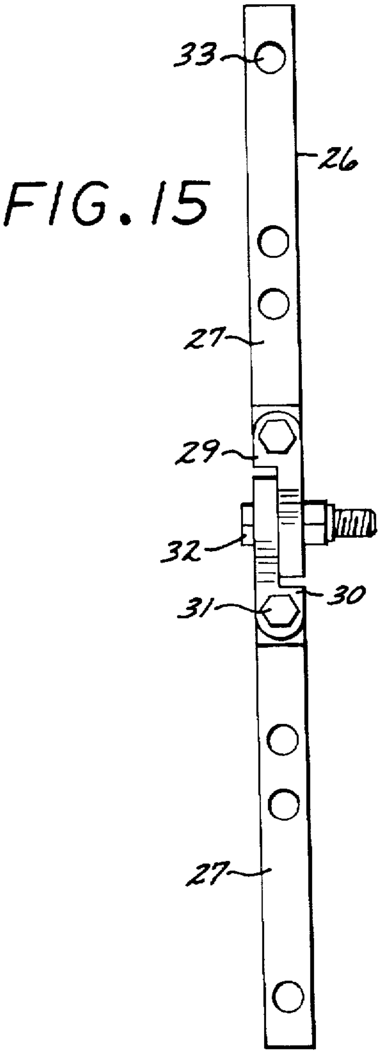
FIG. 15 is a rotated top plan view of the connecting bar shown in FIG. 13.

With reference to FIGS. 13–15, a connecting bar device 26 comprises two elongated connecting or extension arms 27 and 28 pivoted together at a pivot joint including two identical swivel joint parts 29 and 30 fastened together with SAE grade 8 bolt type fasteners and SAE grade 8 nylon insert locking nuts 31 through a male-female hinge intersection. Swivel joint part 29 is positioned opposing swivel joint part 30 and both 29 and 30 are fastened together at a central pivot point with an SAE grade 8 bolt type fastener and SAE grade 8 nylon insert locking nut 32. Parts 27, 28, 29, and 30, when fastened with bolts 31 and 32, create a universal type joint able to flex in all directions and then be fixed into position by tightening bolts 31 and 32. Parts 27 and 28 contain several holes 33 which serve as selectable retention points when the part is inserted into the front and/or back tubular assemblies on the truss module device described in the present invention.

Figure 16:
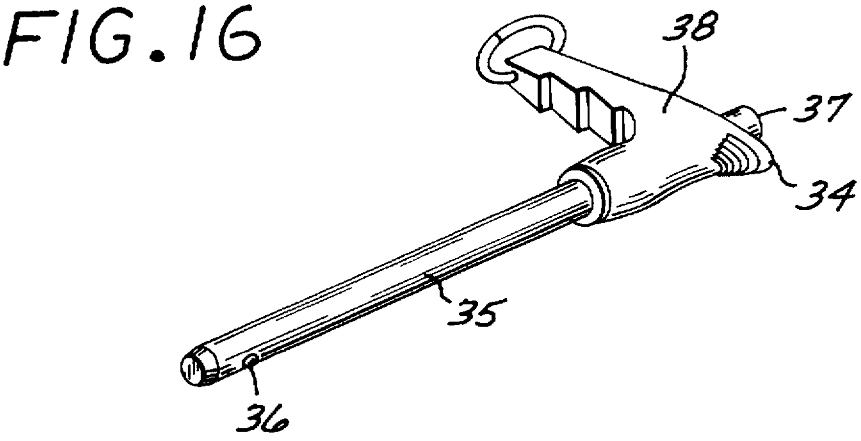
FIG. 16 is a perspective view of a quick release pin component of the present invention.
Figure 18:
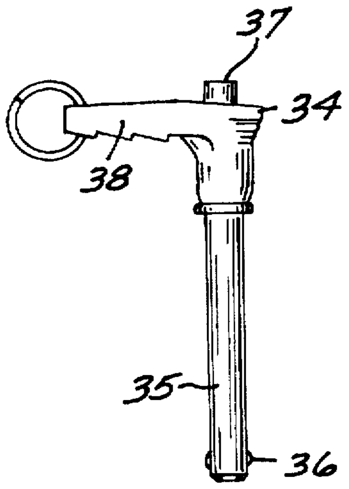
FIG. 18 is a side elevational view of the quick release pin shown in FIG. 16.
Figure 17:
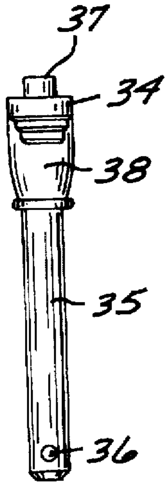
FIG. 17 is a top plan view of the quick release pin shown in FIG. 16.

Referring to FIGS. 16–17, a quick release pin device 34 comprises a cylindrical shaft 35 of a predetermined length which contains two retractable retaining balls 36 at a predetermined location toward the end of the shaft 35. A handle 38 is attached to the top end of the shaft 35 by conventional mechanical means for handling and serves as a stop for the shaft 35. The retaining balls 36 contained within the shaft 35 are spring loaded and will retract into the shaft 35 when a button 37 is depressed at the top of the handle 38. When the button 37 is released, the retaining balls 36 will move to protrude from the shaft 35 and cause the quick release pin to be locked in to the appropriate devices as described in the present invention.

Figure 19:
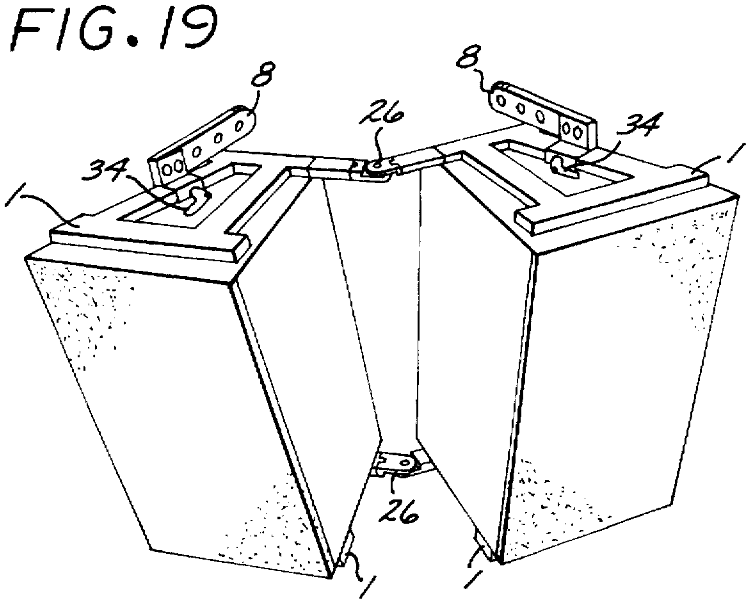
FIG. 19 is a front elevational view of a loudspeaker grouping being suspended by the method of the present invention.
Figure 20:
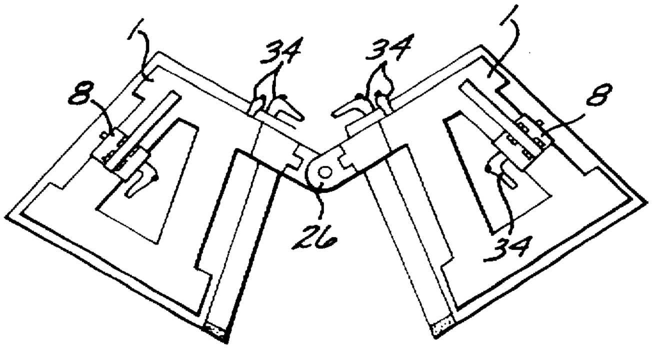
FIG. 20 is a top plan view of the loudspeaker grouping shown in FIG. 19.
Figure 21:
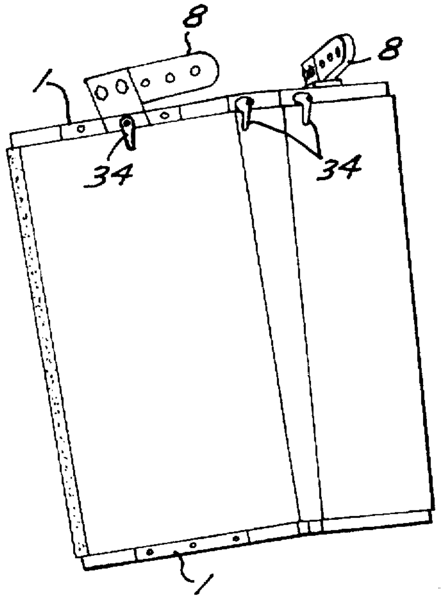
FIG. 21 is a side elevational view of the loudspeaker grouping shown in FIG. 19.

Referring now to FIGS. 19–21, a representative two loudspeaker grouping suspended by the method of the present invention comprises four truss modules 1 fastened to the loudspeakers with conventional mechanical means to the top and the bottom of each loudspeaker. Connecting bar devices 26 are inserted into the rear tubular assemblies of the adjacent truss modules 1 at the top and the bottom of each loudspeaker, the bottom connecting bar 26 being held in place with quick release pins 34 at the selected inward-most position thereby positioning the loudspeakers close together at the bottom. The top connecting bar 26 is held in place with quick release pins 34 at the selected outward-most position thereby positioning the loudspeakers farther apart at the top. The connecting bar 26 is retained in the truss module 1 by passing a quick release pin 34 through one side of the truss module tubular assembly, through the inserted connecting bar, and then through the opposite side of the truss module tubular assembly. The universal joint mechanism built into the connecting bar 26 is adjusted to provide a splay (horizontal spreading) between the loudspeakers and then fastened securely by tightening the bolt fasteners located in the joint of the connecting bars 26.

The loudspeakers, being in a fixed position, can then be suspended as a group utilizing two extended shackle mounts 8 fastened to the top truss modules 1 of each of the loudspeakers with the use of quick release pins 34. The extended shackle mounts 8 can be attached at any one of the selected holes included in the truss module 1 tubular assemblies. The extended shackle mount 8 is retained in the truss module 1 by passing a quick release pin 34 through one side of the extended shackle mount 8, through the truss module 1 tubular assembly, and then through the opposite side of the extended shackle mount 8. The extended shackle mount 8 can be positioned toward the rear of the truss module 1 in order to cause the loudspeaker grouping to tilt downward or the extended shackle mount 8 can be positioned toward the front of the truss module 1 in order to cause the loudspeaker grouping to suspend vertically or tilt upward.

Figure 22:
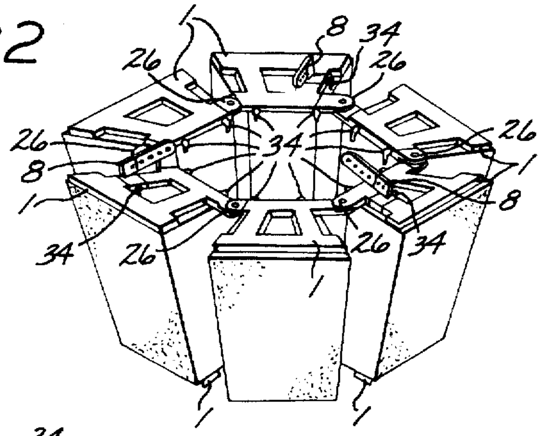
FIG. 22 is a front elevational view of an alternate loudspeaker grouping suspended by the method of the present invention.
Figure 23:
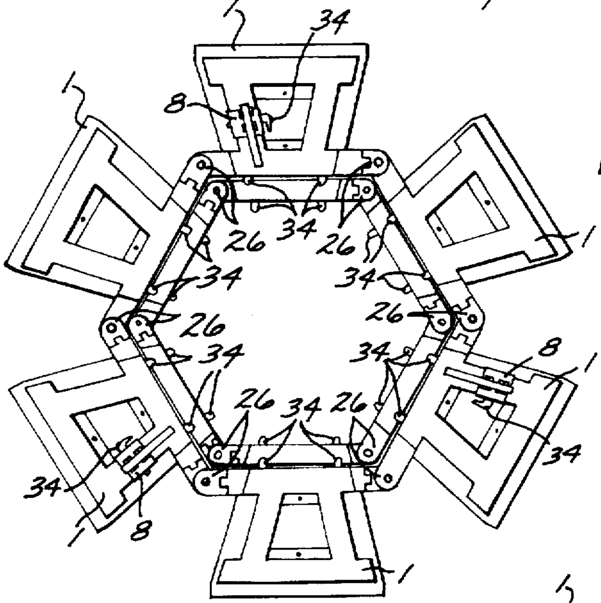
FIG. 23 is a top plan view of the loudspeaker grouping shown in FIG. 22.
Figure 24:
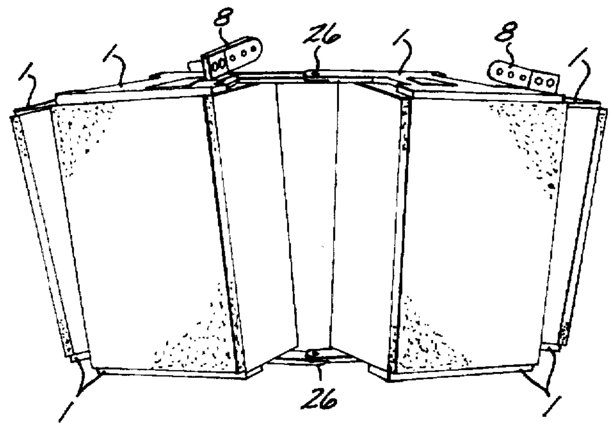
FIG. 24 is a side elevational view of the loudspeaker grouping shown in FIG. 22.

Referring to FIGS. 22–24, a representative six loudspeaker grouping suspended by the method of the present invention comprises twelve truss modules 1 fastened to the loudspeakers with conventional mechanical means to the top and the bottom of each loudspeaker. Connecting bar devices 26 are inserted into the rear tubular assembly of the adjacent truss modules 1 at the top and the bottom of each loudspeaker, the bottom connecting bars 26 being held in place with quick release pins 34 at the selected inward-most position thereby positioning the loudspeakers close together at the bottom. The top connecting bars 26 are held in place with quick release pins 34 at the selected outward-most position thereby positioning the loudspeakers farther apart at the top and automatically tilting the loudspeaker downward. The connecting bar 26 is retained in the truss module 1 by passing a quick release pin 34 through one side of the truss module tubular assembly then through the inserted connecting bar then through the opposite side of the truss module tubular assembly. The universal joint mechanism built into the connecting bar 26 is adjusted to provide a splay (horizontal spreading) between the loudspeakers that will enable a circular loudspeaker grouping and then fastened securely by tightening the bolt fasteners located in the joint of the connecting bars 26.

The loudspeakers, being in a fixed position, can then be suspended as a group utilizing three extended shackle mounts 8 fastened to the top truss modules 1 of each of the loudspeakers with the use of quick release pins 34. The extended shackle mounts 8 can be attached at any one of the selected holes included in the truss module 1 tubular assemblies. The extended shackle mount 8 is retained in the truss module 1 by passing a quick release pin 34 through one side of the extended shackle mount 8 then through the truss module 1 tubular assembly then through the opposite side of the extended shackle mount 8.

With reference to FIGS. 25–27, a representative nine loudspeaker multiple row grouping suspended by the method of the present invention comprises eighteen truss modules 1 fastened to the loudspeakers with conventional mechanical means to the top and the bottom of each loudspeaker. Connecting bar devices 26 are inserted into the rear tubular assembly of the adjacent truss modules 1 at the top and the bottom of each loudspeaker. The top and bottom connecting bars 26 of the top and middle rows of grouped loudspeakers are held in place with quick release pins 34 at the selected inward-most position thereby positioning the loudspeakers close together at the top and at the bottom. The bottom connecting bars 26 of the bottom row of grouped loudspeakers are held in place with quick release pins 34 at the selected inward-most position thereby positioning the loudspeakers close together at the bottom. The top connecting bars 26 of the bottom row of grouped loudspeakers are being held in place with quick release pins 34 at the selected outward-most position thereby positioning the loudspeakers farther apart at the top. The connecting bar 26 is retained in the truss module 1 by passing a quick release pin 34 through one side of the truss module tubular assembly then through the inserted connecting bar then through the opposite side of the truss module tubular assembly. The universal joint mechanism built into the connecting bar 26 is adjusted to provide a splay (horizontal spreading) between the loudspeakers and is then fastened securely by tightening the bolt fasteners located in the joint of the connecting bars 26.

Following the connecting of the loudspeakers to one another, the individual rows of loudspeaker groupings, being in a fixed position, can then be suspended as independent groups utilizing a combination of stacking brackets 22 and/or shackle mounts 15 and/or extended shackle mounts 8 fastened to the selected truss modules 1 of each of the loudspeakers with the use of quick release pins 34. The stacking brackets 22 and shackle mounts 15 and extended shackle mounts 8 can be attached at any one of the selected holes included in the truss module 1 tubular assemblies. The stacking bracket 22 and shackle mount 15 and extended shackle mount 8 is retained in the truss module 1 by passing a quick release pin 34 through one side of the stacking bracket 22 and/or shackle mount 15 and/or extended shackle mount 8 then through the truss module 1 tubular assembly then through the opposite side of the stacking bracket 22 and/or shackle mount 15 and/or extended shackle mount 8. The top row loudspeaker grouping is suspended with two shackle mounts 15 and the middle row loudspeaker grouping is attached to the top row with two stacking brackets 22 fastened to the truss modules 1 as described above. The top row loudspeaker grouping and the middle row loudspeaker grouping are fixed into a vertically stacked configuration with the use of the stacking brackets 22. The bottom row loudspeaker grouping is suspended from the middle row loudspeaker grouping utilizing four extended shackle mounts 8 fastened to the truss modules 1 as described above. Two extended shackle mounts 8 are attached to the bottom truss modules 1 of the middle row at the selected hole positions in the truss module 1 tubular assembly. Two extended shackle mounts 8 are attached to the top truss modules 1 of the bottom row loudspeaker grouping at the selected hole positions in the truss module 1 tubular assembly.

Those skilled in the art will appreciate that by selecting the appropriate extended shackle mount 8 mounting hole in the truss modules 1 attached to the bottom of the middle row loudspeaker grouping, the bottom row loudspeaker grouping may be moved back so that the fronts of the loudspeakers are in coherent alignment. Additionally, by selecting the appropriate extended shackle mount 8 mounting hole in the truss modules 1 attached to the top of the bottom row grouping of loudspeakers, the bottom row downward tilt angle may be adjusted as desired. The connection between the extended shackle mounts 8 attached to the bottom of the middle row grouping of loudspeakers and the extended shackle mounts 8 attached to the top of the bottom row grouping of loudspeakers is achieved by commonplace mechanical means.

The present invention thus provides a method for suspending a plurality of loudspeakers to form a modular loudspeaker enclosure suspension rigging system including the steps of selecting structural members (truss modules) which, when attached to a loudspeaker enclosure, renders that loudspeaker enclosure suspendable. The same structural members (truss modules), when attached to numerous loudspeaker enclosures, render the group of loudspeaker enclosures suspendable as a whole unit from a minimized number of suspension points when various other members selected by steps in the present invention are utilized in conjunction with the truss modules. Moreover, the present invention allows for angle variance between adjacent loudspeaker enclosures by providing steps utilizing multiple adjustable structural components (connecting bars) between adjacent loudspeaker enclosures. The aforementioned connecting bars can be adjusted for proper loudspeaker enclosure aim and then tightened into a rigid connection between adjacent loudspeaker enclosures, thereby rendering the loudspeaker enclosure group a solid mass. The present invention allows for the suspension of the loudspeaker group by a minimal number of suspension points with the utilization of structural mounts (shackle mounts, extended shackle mounts, stacking brackets) connecting onto the truss modules. The present invention provides for the expedient assembly and disassembly of all components parts with the use of structural retaining pins (quick release pins) and/or bolt and nut fasteners.

While the invention has been described with reference to its preferred configuration, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

I claim:

1. A method of adjustably connecting a pair of adjacent loudspeakers in an array of loudspeakers to universally adjust said adjacent loudspeakers to selected positions and orientations, said method including the steps of:

selecting a pair of frame members including coupling elements;

mounting said pair of frame members to said pair of loudspeakers;

selecting a connector having a pair of elongated oppositely disposed connecting arms with articulated proximal ends pivotally engaged about a centrally interposed first axis to form a first pivot joint and pivotally mounted to said connecting arms about respective second and third axes oriented substantially orthogonal to said first axis to form respective second and third pivot joints whereby said first, second and third pivot joints cooperate to form a universal joint; and attaching said connector between said pair of loudspeakers by coupling the distal ends of said connecting arms to respective said coupling elements of respective said loudspeakers.

2. The method according to claim 1 that includes:

adjusting said first, second and third joints to selected positions; and fixing said first, second and third pivot joints against pivoting.

3. The method according to claim 2 wherein:

said step of selecting a connector includes selecting a connector including adjustment bolts fixing said first, second and third pivot joints against pivoting.

4. The method according to claim 3 and further including the steps of:

pivoting said pivot joints to adjust said loudspeakers to said selected positions and orientations; and tightening said adjustment bolts to fix said loudspeakers in said selected positions and orientations.

5. A method for suspending a plurality of individual loudspeakers housed in cabinets having substantially planar top and bottom mounting surfaces from an overhead support in spaced apart relationship for adjustment to different related positions and orientations of said loudspeakers relative to one another to align the acoustic wavefronts and maintain the acoustic centers of said loudspeakers substantially equidistant from a common point source to maximize coherence between said wavefronts, said method comprising the steps of:

selecting a plurality of frame members each including first coupling elements;

mounting said frame members to said cabinets;

selecting a plurality of connectors including oppositely disposed second coupling elements for coupling with said first coupling elements and including pivot joints;

coupling said second coupling elements with said first coupling elements between respective frame members to connect respective cabinets adjacent one another;

adjusting said pivot joints of said connectors to pivot said adjacent cabinets to adjust said loudspeakers to said related positions and orientations relative to one another;

maintaining said adjacent loudspeakers in said positions and orientations; and suspending at least one of said frame members from said overhead support to carry said plurality of loudspeakers therewith.

6. The method according to claim 5 wherein:

said step of selecting said plurality of connectors includes selecting connectors including a pair of elongated oppositely disposed connecting arms terminating in distal ends defining said second coupling elements for coupling with the respective said first coupling elements.

7. The method according to claim 6 wherein:

said step of selecting said plurality of connectors includes selecting connectors including adjustment bolts for maintaining said adjacent loudspeakers in said positions and orientations.

8. The method according to claim 7 wherein:

said step of selecting a plurality of frame members includes selecting a plurality of frame members including laterally disposed open ended tubes defining said first coupling elements and a suspension support formed with a plurality of spaced apart suspension holes, said tubes formed for telescopical receipt therein of the respective said distal ends of said connecting arms;

said step of coupling said second coupling elements with the respective said first coupling elements includes telescoping said connecting arms within the respective said open ended tubes, and said step of maintaining said loudspeakers includes tightening said adjustment bolts to fix said respective pivot joints against pivoting said loudspeakers out of said positions and orientations.

9. The method according to claim 8 and further including the steps of:

selecting a suspension mount having a releasable pin engageable with said suspension holes and a support bar for securing to an overhead support; and engaging said suspension mount pin to one of said suspension holes to carry said loudspeakers when suspended.

10. The method according to claim 8 wherein:

said mounting step includes mounting said frame members to said upper and lower loudspeaker mounting surfaces to define respective upper and lower mounted frame members.

11. A method according to claim 10 wherein said coupling step includes:

coupling said second coupling elements with the respective said first coupling elements between adjacent pairs of said frame members to position said loudspeakers adjacent one another to form multiple rows of interconnected loudspeakers wherein after said coupling step and before said adjusting step said method further includes the steps of:

selecting a plurality of vertical couplers each having elongated upstanding support bars formed with engagement holes disposed at the opposite ends thereof and releasable pins telescopically engageable with said engagement holes and said suspension holes for aligning and coupling said vertical couplers to the respective pairs of said vertically adjacent mounted frame members;

aligning said rows of loudspeakers substantially vertically in stacked relationship to form higher and lower rows of loudspeakers such that said lower mounted frame members of the higher said rows are substantially vertically adjacent to the respective said upper mounted frame members of the lower said rows;

interposing at least one said vertical coupler between at least one pair of said vertically adjacent mounted frame members such that said engagement holes axially align with said suspension holes; and engaging said releasable pins telescopically through said engagement holes and said suspension holes.

12. A method for suspending a plurality of individual loudspeakers from an overhead support in spaced apart relationship for adjustment to different related positions and orientations relative to one another to align the acoustic wavefronts and maintain the acoustic centers of said loudspeakers substantially equidistant from a common point source to maximize coherence between said wavefronts, said method comprising the steps of:

selecting a plurality of frame members each including laterally disposed open ended tubes defining first coupling elements and a suspension support formed with a plurality of spaced apart suspension holes;

mounting said plurality of frame members to said individual loudspeakers;

selecting a plurality of connectors each including a pair of elongated oppositely disposed connecting arms terminating in distal ends defining second coupling elements for coupling said distal ends with said first coupling elements, said connectors further including pivot joints and adjustment bolts for fixing said pivot joints against pivoting;

coupling said second coupling elements with the respective said first coupling elements, including telescoping said connecting arms within the respective said open ended tubes;

adjusting said pivot joints of said connectors to pivot adjacent said loudspeakers to said related positions and orientations;

tightening said adjustment bolts to fix said speakers in said selected positions and orientations;

selecting a suspension mount having a releasable pin engageable with said suspension holes and a support bar for securing to said overhead support;

engaging said suspension mount pin to one of said suspension holes to cause said loudspeakers to tilt downwardly at a predetermined angle when suspended; and suspending said suspension mount from said overhead support to carry said plurality of loudspeakers therewith.

* * * * *